(12) United States Patent
Gee et al.

(10) Patent No.: US 8,328,509 B2
(45) Date of Patent: Dec. 11, 2012

(54) TURBOMACHINE

(75) Inventors: David Gee, Grenoside (GB); Chris Enright, Halifax (GB); Robert Holroyd, Halifax (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/757,992

(22) Filed: Apr. 10, 2010

(65) Prior Publication Data
US 2010/0196148 A1 Aug. 5, 2010

Related U.S. Application Data

(63) Continuation of application No. PCT/GB2008/003460, filed on Oct. 10, 2008.

(30) Foreign Application Priority Data

Oct. 13, 2007 (GB) .................................. 0720478.7

(51) Int. Cl.
*F01D 25/08* (2006.01)
(52) U.S. Cl. ........................................ 415/180; 415/231
(58) Field of Classification Search .................. 415/177, 415/180, 229, 230, 231
See application file for complete search history.

(56) References Cited

U.S. PATENT DOCUMENTS

| | | | |
|---|---|---|---|
| 4,364,717 A | 12/1982 | Schippers et al. | |
| 4,865,332 A | 9/1989 | Ruetz | |
| 5,066,192 A | 11/1991 | Honda et al. | |
| 5,890,881 A | 4/1999 | Adeff | |
| 6,905,316 B2 | 6/2005 | Parker et al. | |
| 7,086,842 B2 * | 8/2006 | Wild | 417/407 |

FOREIGN PATENT DOCUMENTS

| | | |
|---|---|---|
| DE | 196 48 641 A1 | 5/1998 |
| EP | 1 184 609 A2 | 3/2002 |
| JP | 58-93932 | 3/1983 |

OTHER PUBLICATIONS

International Search Report, PCT/GB2008/003460, Cummins Turbo Technologies Limited, Feb. 6, 2009.
United Kingdom Search Report, GB0720478.7, Cummins Turbo Technologies Limited, Jan. 31, 2008.

* cited by examiner

*Primary Examiner* — Dwayne J White
(74) *Attorney, Agent, or Firm* — Krieg DeVault LLP; Matthew Fair, Esq.

(57) ABSTRACT

A turbomachine comprises a housing (71) defining a bearing cavity (71) and a turbine chamber (77a) separated by a first wall. A heat shield (72) is disposed between the first wall and the turbine wheel (77), a heat shield cavity (78) being defined between the first wall and the heat shield (72). The shaft (81) extends through a passage (85) defined at least in part by a first aperture (86) in said wall and a second aperture (87) in the heat shield (72). A first seal (88) is provided between the shaft (81) and said first aperture (86). The housing defines a first gas channel (79) communicating with the heat shield cavity (78) for connection to a pressure source for raising pressure within the heat shield cavity (78). A second channel (92) is provided between the heat shield cavity (78) and said passage (85), the second channel opening to said passage (85) on the opposite side of said first seal (88) to said bearing assembly (82). A second seal (89) is provided between the shaft (81) and said second aperture (87).

34 Claims, 6 Drawing Sheets

TURBOMACHINE

CROSS REFERENCE TO RELATED APPLICATIONS

The present application is a continuation of PCT/GB20081003460 filed Oct. 10, 2008, which claims priority to United Kingdom Patent Application No. 0720478.7 filed Oct. 13, 2007, each of which is incorporated herein by reference.

FIELD OF THE INVENTION

The present invention relates to turbomachinery, such as for instance a power turbine or turbocharger for an internal combustion engine. In particular, the present invention relates to the reduction of oil leakage from a turbomachine bearing housing into a turbine housing or a cavity behind a heat shield.

BACKGROUND

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. It is well known that providing an effective sealing system to prevent oil leakage from the central bearing housing into the turbine housing is problematic. It is however important to prevent oil leaking into the turbine housing where it will mix with the exhaust gas and increase exhaust emissions any may cause damage to downstream components such as a catalytic converter.

A turbocharger turbine wheel may be friction welded to a seal boss at the end of the turbocharger shaft, the seal boss having a larger diameter than the shaft and rotating within an annular passage through a housing wall separating the bearing housing from the turbine housing. Known oil seal arrangements comprise a seal ring located around the seal boss within the passage providing a seal in the manner of a piston ring.

Whereas the turbine of a turbocharger drives a compressor, in a power turbine the end of the turbine shaft remote from the turbine wheel transmits power via a mechanical coupling. In a turbocompound engine comprising a power turbine connected in series with the turbine of a turbocharger, a gear wheel may be fixed to the end of the power turbine shaft to transmit power into the crankshaft of the engine via an appropriate coupling (such as for example a fluid coupling or a gear or other drive mechanism), hydraulically, mechanically or electrically. As with a turbocharger, the shaft of a power turbine is supported on bearing assemblies, including appropriate lubricating systems, located within a bearing housing connected to the turbine housing. The bearing arrangement at the turbine end of the shaft may be substantially the same as that found in a turbocharger, although the bearing arrangement at the drive end of the shaft may be a ball bearing assembly.

Turbines, whether included in a turbocharger, a power turbine or other turbomachine, are generally provided with a heat shield located between the turbine wheel and the turbine/bearing housing wall through which the turbine shaft passes. The heat shield, which is typically a sheet metal component installed in the turbine housing behind the turbine wheel, is provided to prevent overheating of the bearing housing, which can for instance result in oil coking in the bearing housing.

SUMMARY

It is an object of the present invention to obviate or mitigate the problems of oil leakage from a turbomachine bearing housing into the turbine housing or the heatshield.

According to the present invention there is provided a turbomachine comprising:

a housing defining a bearing cavity and a turbine chamber separated by a first wall;

a turbine wheel mounted to a shaft for rotation within said turbine chamber about a machine axis;

a heat shield disposed between the first wall and the turbine wheel, a heat shield cavity being defined between the first wall and the heat shield;

the shaft extending from the turbine chamber into the bearing cavity through a passage defined at least in part by a first aperture in said wall and a second aperture in the heat shield, the shaft being mounted for rotation on a bearing assembly provided in the bearing cavity;

a first seal between the shaft and said first aperture;

the housing defining a first gas channel communicating with the heat shield cavity for connection to a pressure source for raising pressure within the heat shield cavity;

a second channel between the heat shield cavity and said passage, the second channel opening to said passage on the opposite side of said first seal to said bearing assembly; and a second seal provided between the shaft and said second aperture.

Raising the pressure in the passage relative to the pressure in the bearing cavity reduces the tendency of oil to leak across the first seal. In this regard, it is preferable that the pressure within the heat shield cavity is raised above that typically established within the bearing cavity adjacent the first aperture.

The first seal may comprise one or more seal rings, including for instance a split overlapping ring seal.

The second seal may comprise one or more seal rings, such as for instance a split ring seal.

In some embodiments the second channel may comprise an annular gap defined between said wall and said heat shield between said first and second apertures.

In some embodiments the second channel may comprise one or more circumferentially extending slots defined around said passage.

In some embodiments the second channel may comprise one or more apertures opening into said passage and said heat shield cavity.

The first channel may extend between said heat shield cavity and an external surface defined by the housing, and may comprise a plurality of channels.

The shaft may have an enlarged diameter portion which is located and rotates within said passage. The enlarged diameter portion of the shaft may define a generally radially extending annular wall which faces (and possible abuts) said bearing assembly. The annular wall may be configured to propel oil radially away from said shaft as said shaft rotates. The oil may be propelled into an annular oil collecting channel provided within said bearing cavity circumferentially surrounding said radially extending annular wall.

In some embodiments the enlarged diameter portion of the shaft has a radially outer circumferential surface extending generally axially, and wherein an oil slinging groove extends into the enlarged portion, the oil slinging groove having a mouth defined between a first circumferentially extending rim and a second circumferentially extending rim, wherein the second rim is spaced both radially and axially from the first rim.

The heat shield may be formed integrally with the housing wall rather than provided as a separate component. For instance, a portion of the housing defining said heat shield and said wall may comprise a single component, e.g. a single casting.

The turbomachine may for instance be a turbocharger including a turbine housing defining said turbine chamber, and a bearing housing defining said bearing cavity. Alternatively the turbomachine may be a power turbine including a turbine housing defining said turbine chamber, and a bearing housing defining said bearing cavity. In a power turbine an exhaust gas driven turbine transfers power via a drive connection which rotates at the opposite end of the shaft to the turbine wheel. The drive connection may for instance be coupled to an output shaft of an internal combustion engine. The power turbine may be a radial flow or an axial flow turbine. In an axial flow turbine, the turbine has an axial inlet directing exhaust gas in a generally axial direction through the turbine wheel towards an annular outlet. A turbocharger and a power turbine may be combined in a turbo-compound engine.

The present invention also provides a method of reducing oil leakage in a turbomachine comprising a housing defining a bearing cavity and a turbine chamber separated by a first wall;

a turbine wheel mounted to a shaft for rotation within said turbine chamber about a machine axis;

a heat shield disposed between the first wall and the turbine wheel, a heat shield cavity being defined between the first wall and the heat shield;

the shaft extending from the turbine chamber into the bearing cavity through a passage defined at least in part by a first aperture in said wall and a second aperture in the heat shield, the shaft being mounted for rotation on a bearing assembly provided in the bearing cavity;

a first seal between the shaft and said first aperture;

a second channel between the heat shield cavity and said passage, the second channel opening to said passage on the opposite side of said first seal to said bearing assembly; and a method comprising supplying pressurised air to said heat shield cavity to raise the pressure within the heat shield cavity and thereby raise the pressure within the passage on the opposite side of said first seal to said bearing assembly.

DESCRIPTION OF THE DRAWINGS

Specific embodiments of the present invention will now be described, by way of example only, with reference to the accompanying drawings, in which.

DETAILED DESCRIPTION

Figure 1:
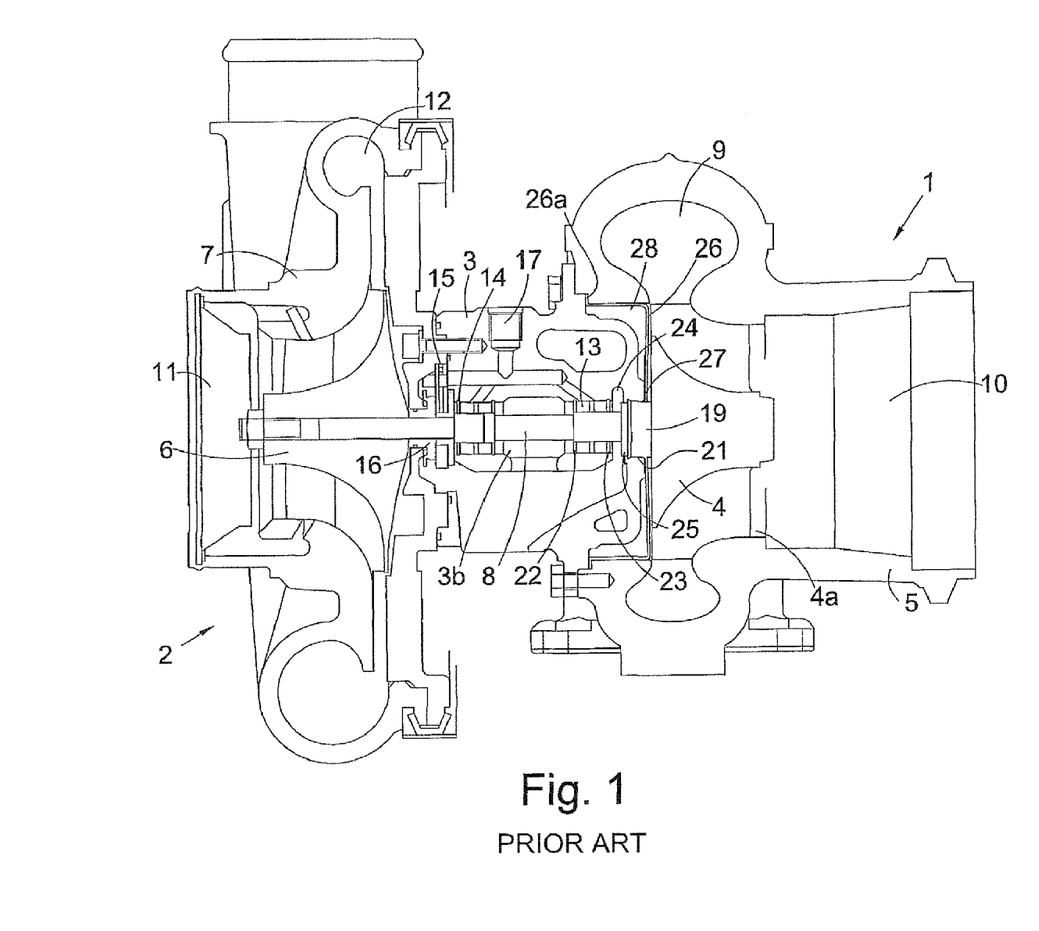
FIG. 1 is a cross-section through a known turbocharger.

Referring to FIG. 1, the illustrated turbocharger (as disclosed in U.S. Pat. No. 7,086,842) comprises a turbine 1 joined to a compressor 2 via a central bearing housing 3. The turbine 1 comprises a turbine wheel 4 rotating within a turbine housing 5. Similarly, the compressor 2 comprises a compressor wheel 6 which rotates within a compressor housing 7. The turbine wheel 4 and compressor wheel 6 are mounted on opposite ends of a common turbocharger shaft 8 which extends through the central bearing housing 3.

The turbine housing 5 has an exhaust gas inlet volute 9 located annually around the turbine wheel 4 and an axial exhaust gas outlet 10. The compressor housing 7 has an axial air intake passage 11 and a compressed air outlet volute 12 arranged annually around the compressor wheel 6.

In use, the turbine wheel 4 is rotated within a turbine chamber 4a by the passage of exhaust gas from the annular exhaust gas inlet 9 to the exhaust gas outlet 10, which in turn rotates the compressor wheel 6 which thereby draws intake air through the compressor inlet 11 and delivers boost air to the intake of an internal combustion engine via the compressor outlet volute 12.

The turbocharger shaft 8 rotates on fully floating journal bearings 13 and 14 housed in a bearing cavity 3b towards the turbine end and compressor end respectively of the bearing housing 3. The compressor end bearing assembly 14 further includes a thrust bearing 15 which interacts with an oil seal assembly including an oil slinger 16. An oil slinger is an annular component which rotates with the shaft and typically comprises a number of radially extending passages which effectively act as vanes for slinging oil away from the shaft and in particular away from the passage from the bearing housing into the compressor housing. An annular splash chamber located around the thrust bearing and sealing assembly collects the oil for re-circulation within the lubrication system. The splash chamber may be provided with drainage channels to drain oil to a sump. Details of the compressor end bearing and oil seal are not important to an understanding of the present invention and will not be described further. Oil is supplied to the bearing housing from the oil system of the internal combustion engine via oil inlet 17 and is fed to the bearing assemblies by oil passageways 18.

The turbine wheel 4 is joined to the turbine end of the turbocharger shaft 8 at a seal boss 19. Generally the seal boss 19 is formed integrally with the shaft 8 (and as such forms part of the shaft) and is joined (for instance by friction welding) to a boss portion on the back of the turbine wheel 4. The seal boss 19 extends through an annular passage 20 in a bearing housing wall 3a and into the turbine housing. The seal boss 19 is sealed with respect to the annular passage 20 by an overlapping type split ring 21 which inhibits oil and gas leakage through the passage 20. The turbine end journal bearing 13 is located between circlips 22 and 23. Oil is fed to the bearing 13 via oil passageway 18 and the bearing 13 is provided with circumferentially spaced radial holes 27 for oil to pass to the turbocharger shaft 8. An annular oil return groove 24 is radially recessed into the bearing housing 3 adjacent the passage 20 through the housing wall 3a. The oil return groove 24 surrounds the shaft 8. The annular face of the seal boss 19 is machined with an undercut 25 so that rather than extending strictly radially from the shaft 8, it extends at an angle away from the passage 20 through the bearing housing wall 3a. Thus as the shaft 8 rotates, oil present on the annular surface 31 is projected both radially and axially away from the passage 20. As discussed in U.S. Pat. No. 7,086,842 the undercut seal boss 19 functions as an oil slinger reducing the flow of oil towards the passage 20 and seal ring 21.

A pressed metal heat shield 26 is located in the turbine housing between the turbine wheel 4 and the bearing housing 3. The heat shield separates the hot exhaust gas flow from the bearing housing to reduce heat transfer to the bearing housing which could otherwise result in overheating of the bearings. At its radial outer periphery 26a the heat shield 26 is clamped between the bearing housing 3 and the turbine housing 5. The heat shield 26 has a central aperture 27 which surrounds and is spaced from the boss 19 to allow free rotation of the shaft 8. A heat shield cavity 28 is defined between the heat shield 26 and the bearing housing 3 to reduce heat flow to the bearing housing from the hot exhaust gas flowing through the turbine housing.

Figure 2:
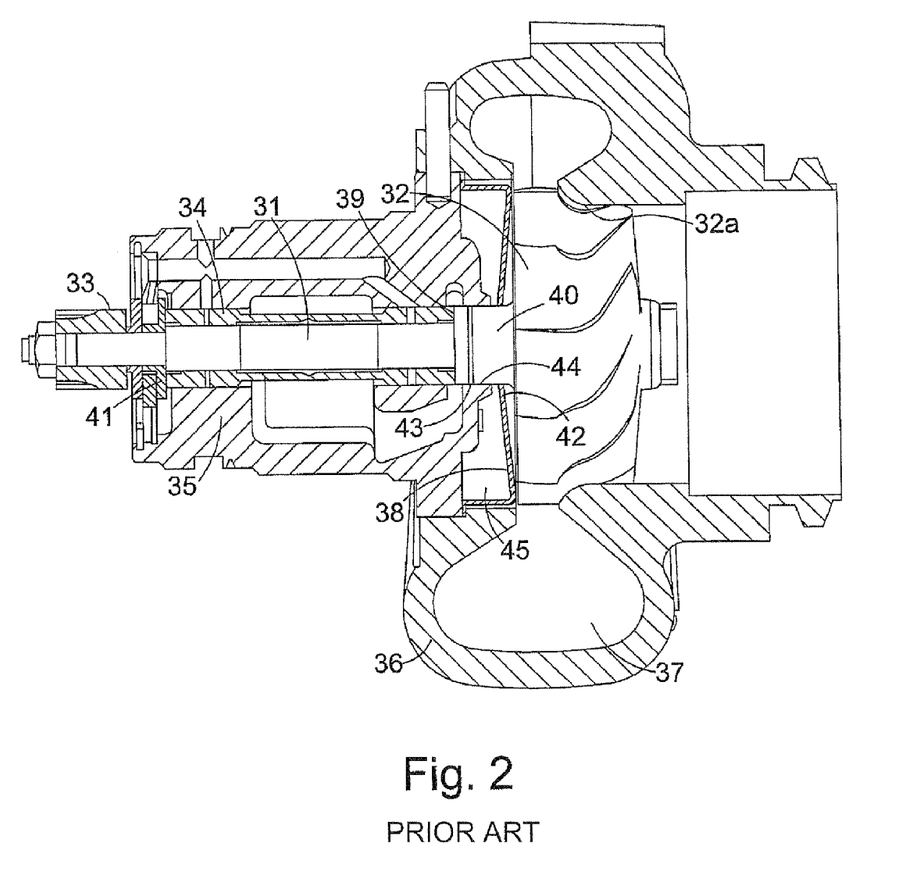
FIG. 2 is a cross-section though a known radial flow power turbine.

Referring to FIG. 2, this illustrates a radial flow power turbine (as discussed in U.S. Pat. No. 6,905,316) comprising a shaft 31 which supports at one end a turbine wheel 32 within a turbine chamber 32a and supports at the other end a drive gear 33. The shaft 31 is supported in a one piece tubular bearing 34 which is supported within the bearing cavity of a bearing housing 35. The bearing housing 35 is secured to a turbine housing 36 which defines a volute 37 through which exhaust gases delivered from an internal combustion engine pass to apply torque to the turbine 32. A heat shield 38 protects the bearing assembly from the hot gases which flow through the turbine chamber 32a and drive the turbine 32.

One end of the bearing 34 abuts a shoulder 39 defined by a seal boss 40 at the turbine end of the shaft 31. The other end of the bearing 4 abuts a flange 41 which forms part of a thrust bearing at the drive end of the shaft 31. As described in U.S. Pat. No. 6,905,316, this single piece bearing replaces the more conventional bearing arrangements (which typically include a fixed bearing at the drive end of the shaft) which improves load bearing at the drive end of the power turbine.

As with the turbocharger of FIG. 1, the heat shield 32 is a pressed metal member clamped at its radial outer periphery between the turbine housing 36 and bearing housing 35, and defining a central aperture 42 within which the seal boss 40 rotates (a small-annular clearance again being left between the aperture 42 and the seal boss 40). A heat shield cavity 45 is defined between the heat shield 38 and the bearing housing 35 to provide some insulation between the two.

The seal arrangement at the turbine end of the shaft 31 is substantially the same as that incorporated in the turbocharger of FIG. 1, and as such comprises a seal ring 43 (which again is typically a split ring similar to a conventional piston ring) which seals the boss 40 with respect to a passage 44 through the bearing housing 35.

Figure 3:
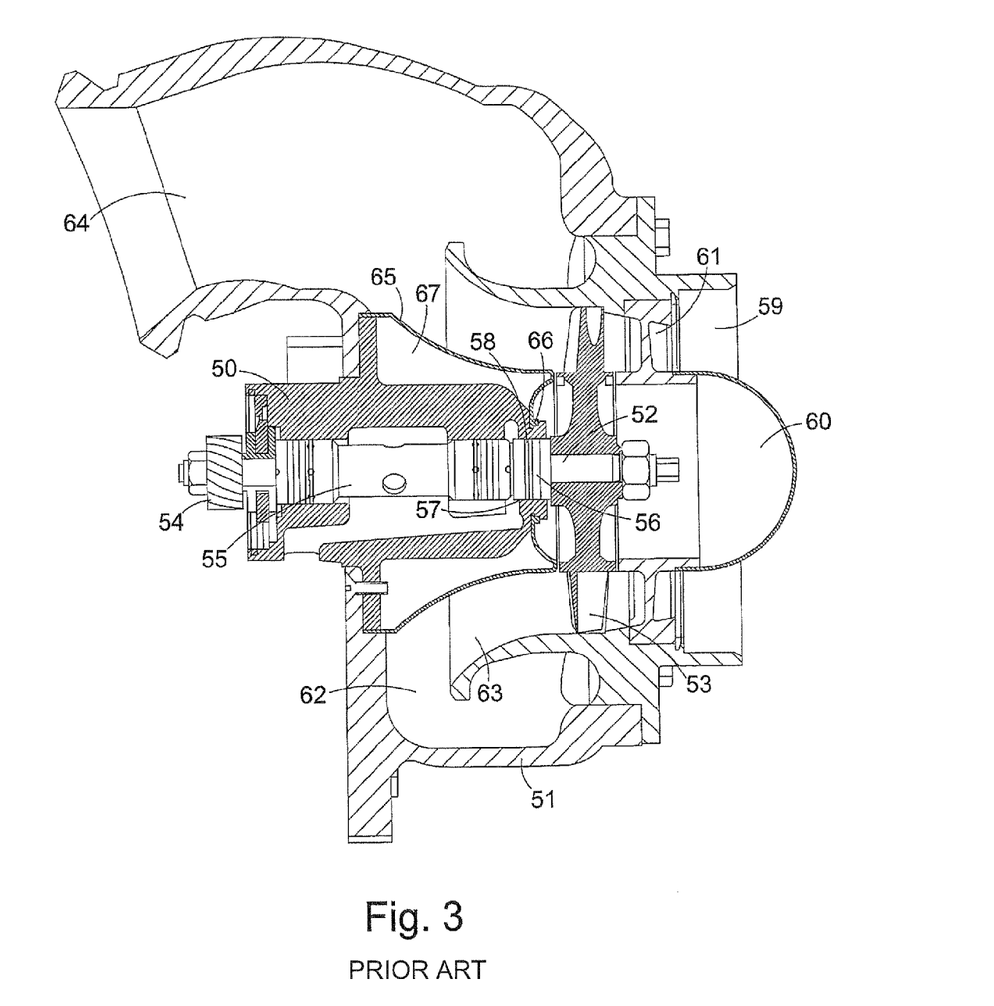
FIG. 3 is a cross-section through a known axial flow power turbine.

FIG. 3 illustrates a known axial flow power turbine. The turbine includes a bearing housing 50 and an axial flow turbine housing 51. A shaft 52 extends through the bearing housing 50 and supports at one end a turbine wheel 53 and at the other end a drive gear 54. The shaft is supported on a one piece bearing 55 which is substantially the same as the one piece bearing 31 of FIG. 2 (and U.S. Pat. No. 6,905,316) and will not be described in further detail. Similarly, the turbine wheel 53 is joined to the end of the shaft 52 at a seal boss 56 which extends through an annular passage 57 in a wall of the bearing housing 50. Seal boss 56 is sealed with respect to the passage 57 by a seal ring 58, which may be a split overlapping ring.

The turbine housing 51 comprises an axial annular inlet passage 59 defined around a domed nozzle 60 and includes a stationary annular vane array 61. Exhaust gas flows through the annular inlet passage 59, through the turbine wheel 53, and into an annular collector portion 62 of the turbine outlet via an annually flared turbine diffuser portion 63 which is an extension of the inlet passage 59. Gas exits the turbine via a generally axially oriented outlet 64.

A pressed metal heat shield 65 is once again provided to separate the bearing housing 50 from the exhaust gas flow. The configuration of the heat shield 65 is to a large extent dictated by the axial flow path of the exhaust gas through the turbine, and in particular the heat shield 65 defines a radially inner surface of the turbine diffuser portion 62 assisting in directing exhaust gas flow into the turbine outlet 62/63. At its radially outermost periphery the heat shield 65 is again clamped between the bearing housing 50 and the turbine housing 51, but in this instance the radially inner periphery of the heat shield 65 contacts the bearing housing 35 around the shaft passage 57 and is held in position by a retaining ring 66. A heat shield cavity 67 is defined between the heat shield 65 and the bearing housing 51 to reduce heat transfer to the bearing housing 51 from the hot exhaust gas flowing through the turbine.

The present invention relates to the seal arrangement at the turbine end of a turbomachine shaft, and one embodiment of the invention as applied to an axial flow power turbine will now be described with reference to FIG. 4.

Figure 4:
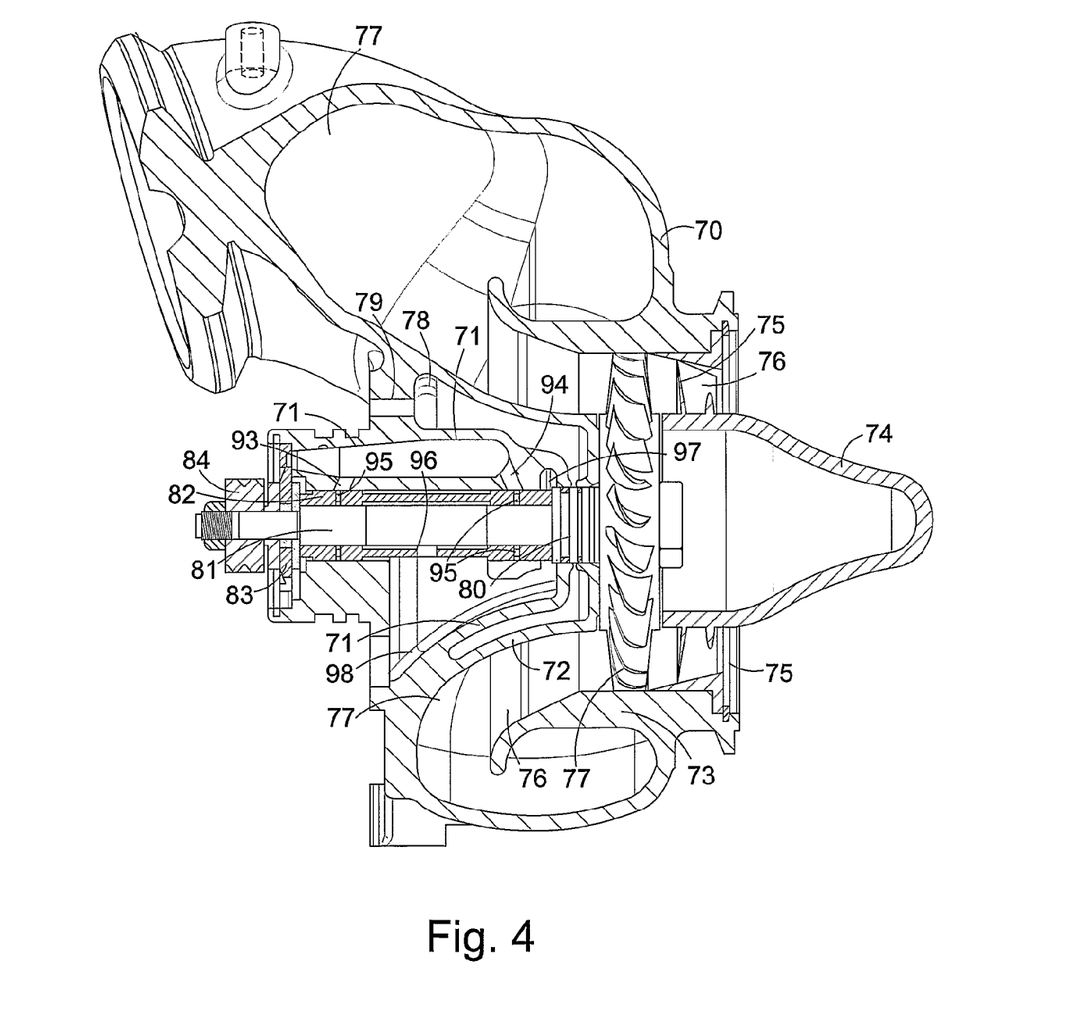
FIG. 4 is a cross-section through an axial flow power turbine according to the present invention.

Referring to FIG. 4, this illustrates a power turbine in accordance with the present invention in which a turbine housing 70, a bearing housing 71, and a heat shield 72 are integrated as a single component which may for instance be formed as a single casting (although certain features of the housing may be machined post-casting). The turbine housing has an axial inlet portion 73 which together with a nozzle 74 defines an annular inlet passage 75. The nozzle 74 is held in position within the axial inlet 73 by a retaining ring 75. An annular array of stationary vanes 76 is disposed in the inlet passage 75 upstream of a turbine wheel 77 which rotates within a turbine chamber 77a.

The inboard end of the axial inlet 73 flares radially outwards to define a turbine diffuser portion 76 which leads to the turbine outlet which comprises an annular collector portion 77 and a generally radial outlet passage 78.

The exhaust gas flow path through the turbine housing 70 is separated from the bearing housing 71 by an integral heat shield 72 which also defines part of the turbine housing diffuser portion 76 and annular outlet portion 77. A heat shield cavity 78 is defined between the heat shield 72 and the bearing housing 71 and a passage 79 extends through the turbine housing to the cavity 78. The purpose of the passage 79 will be described further below.

The turbine wheel 77 is mounted (for instance by friction welding) to one end of a seal boss 80 defined at one end of a shaft 81. The shaft 81 is supported for rotation within a single piece tubular bearing 82 which is substantially the same as the bearings shown in FIGS. 2 and 3. The bearing is restrained within a bearing cavity 71a between the boss 80 and a flange 83 which forms part of a thrust bearing at the drive end of the shaft 81 which supports a drive gear 84. Again, details of the bearing and drive gear assembly at the drive end of the shaft may be substantially the same as those illustrated in FIGS. 2 and 3.

Figure 5:
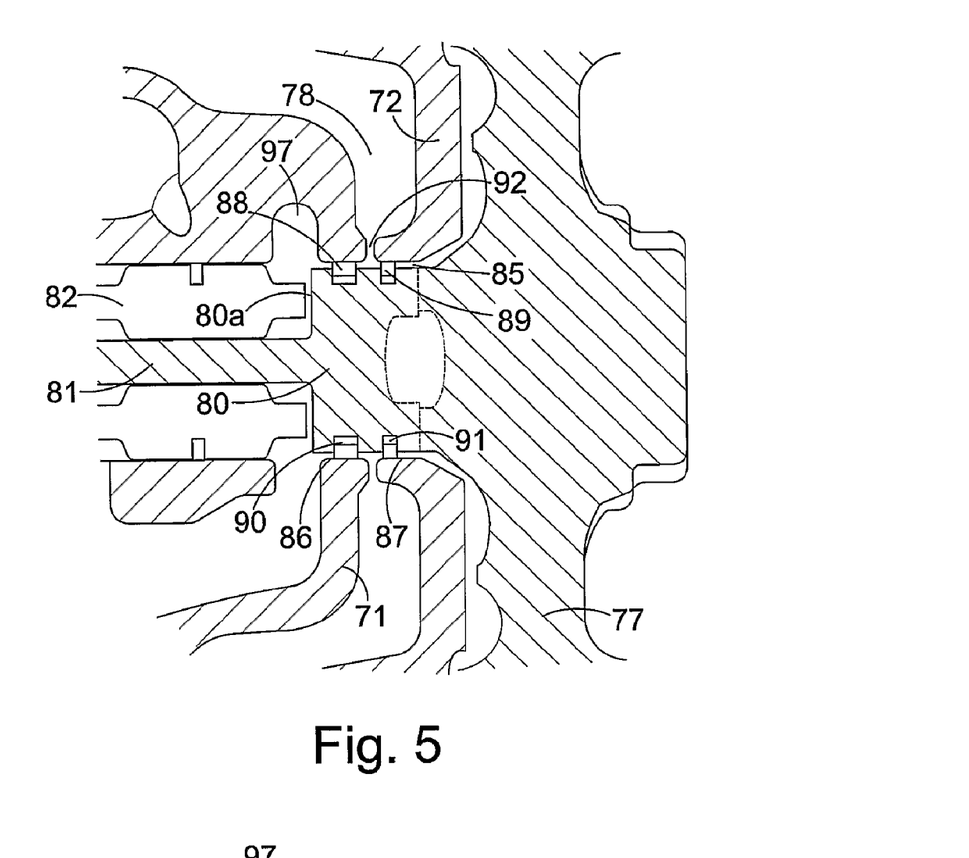
FIG. 5 is an enlarged cross-section through part of the turbine of FIG. 4.

As shown in FIG. 4, and in more detail in FIG. 5 (which is an enlargement of the seal arrangement at the turbine end of the shaft 81), the seal boss 80 rotates within a passage 85 defined in part by an aperture 86 in a wall of the bearing housing 71, and in part by an aperture 87 through the heat shield 72. The seal boss is sealed with respect to the passage 87 by a first seal ring 88 which provides a gas seal between the seal boss 80 and the aperture 86 defined by the bearing housing 71, and a second seal ring 89 which provides a gas seal between the seal boss 80 and the aperture 87 defined by the heat shield 72. The seal rings 88 and 89 are preferably split overlapping ring seals and are each located in respective annular grooves 90 and 91 defined in the outer surface of the seal boss 80.

An annular gap 92 is defined between the bearing housing 71 and heat shield 72 adjacent the passage 85 which provides fluid communication between the cavity 78 and the portion of passage 85 defined between the first and second seal rings 88 and 89.

Oil is supplied to the bearing housing 71 for lubrication of the bearing 81 and passes to the bearing through oil channels 93 and 94 at the compressor end and turbine end of the bearing 82 respectively. The bearing 82 is provided with oil passageways 95 which permit oil to flow through the bearing to the shaft 81. An aperture 96 in a central portion of the bearing 82 ensures that oil can drain freely from the inner bearing surfaces. The bearing housing also defines an annular splash chamber 97 at the turbine end of the bearing housing which collects oil splashing back from the rotating seal boss 80 and delivers this to the bearing cavity oil drain 98, which is steeper than is conventionally the case as a result of the integral casting of the bearing housing and heat shield (which can be beneficial when the turbine is inclined—such as when it is included in a vehicle which is on an incline).

The oil supply to the bearing housing can come from any appropriate source. Typically the oil supply will be delivered from the pressurised oil supply system of a combustion engine, for instance via an oil feed from the combustion engine crank case. Similarly, the oil may drain from the bearing housing to a sump which may be the oil sump of the internal combustion engine, or a gear box oil sump. It will be appreciated that other oil supply arrangements are possible.

Oil pressure within the bearing housing may vary, but will generally be higher than the pressure in the turbine housing behind the turbine wheel. This is particularly the case for an axial flow power turbine as pressures below atmospheric pressure can be generated behind the turbine wheel. Pressure drop from the bearing housing to the turbine housing can exacerbate the problem of oil leakage from the bearing housing into the turbine housing, and thus into the exhaust gas flow. In accordance with the present invention this problem is addressed by pressurising the cavity 78 defined between the heat shield 72 and the bearing housing 71 via the passage 79. Pressure within the cavity 78 is transmitted to the portion of the seal boss passage 85 which is defined between the first and second seal rings 90 and 91. This has the effect of raising the pressure behind the first seal ring 90 which seals the shaft (seal boss 80) with respect to the bearing housing. Reducing the pressure drop across the seal ring 90 from the bearing housing to the turbine housing reduces the likelihood of oil leakage past the seal ring 90 from the bearing housing.

The heat shield cavity 78 may be pressurised to a pressure above that typically encountered in the bearing housing. A pressure of as little as about 0.2 bar gauge to about 1 bar gauge may be sufficient in a typical power turbine. Although oil supply to the bearing housing may be supplied at a pressure of around 5 bar gauge, the oil pressure in the vicinity of the seal boss 80 will generally be much lower than this given the restricted flow paths for the oil to reach this region of the bearing housing.

Raising the pressure in the heat shield cavity 78, and thus in the portion of the passage 85 between the seal rings 90 and 91 will have a beneficial effect in the reduction of oil leakage across the seal ring 90. That is, even if the raised pressure within the cavity 78 remains below that within the bearing housing in the region of the seal boss 80, the pressure difference across the seal ring 90 may nevertheless be reduced. However, it is preferable that the pressure within the cavity 78 is at a level at least generally approximate the maximum pressure that will occur in the bearing housing adjacent the seal boss 80, and more preferably still higher than this level.

In the embodiment of the invention described above, both seal rings 90 and 91 are split overlapping rings. In alternative embodiments of the invention the second seal ring 91 could be replaced by a simple non-overlapping split ring which could bring a cost saving. The efficacy of the seal between the seal boss 80 and the aperture 87 through the heat shield 72 is less significant than that of the first seal ring 90. Although it is preferable not to have any air flow from the cavity 78 into the turbine housing, a small air flow under some circumstances will not present any significant problem. Indeed, in other alternative embodiments of the invention this second seal ring 91 could be omitted altogether provided the required pressure can be maintained in the cavity 78 without unacceptable levels of air flow into the turbine housing.

In practice, it may be difficult to measure the oil pressure within the bearing housing adjacent the seal boss. For any given application, the optimum pressure for the cavity 78 could be determined empirically through testing. Alternatively, the oil pressure could be measured at the oil drain which will generally be similar to the pressure existing at the seal boss 80. In some embodiments of the invention the pressure within the cavity 78 may vary, and may well be deliberately varied, under different operational conditions of the turbine or equipment (such as an internal combustion engine) in which the turbine is incorporated.

A pressurised gas (preferably air) supply may be delivered to the cavity 78 through the passage 79. A dedicated pressurised gas (air) source (not shown) may be provided. In applications in which the turbine is connected to a internal combustion engine, pressurised air may for instance be derived from an air brake system, or auxiliary air supply. Pressurised air could also be derived from an upstream turbocharger in applications in which the turbine is used in conjunction with an upstream turbocharger (perhaps as a power turbine in a turbocompound system, or as a second turbocharger in a dual turbocharger system). Similarly, another power turbine component, such as a gearbox etc, could be used to pressurise air within the heat shield cavity 78.

With the embodiment of the invention shown in FIGS. 4 and 5, the heat shield 72 is integral with the bearing/turbine housing. This is particularly advantageous as it obviates the need to provide a seal at the radially outer periphery of the heat shield in order to help maintain the desired pressure in the heat shield cavity 78. Provision of an effective seal in this region is for instance problematic with conventional pressed metal heat shields, due at least in part to differential expansion between the heat shield and the housing. With an axial flow powered turbine as illustrated, the need to provide a seal in this location can also adversely affect the aerodynamic properties of a turbine diffuser/outlet provided with a conventional heat shield.

Forming the heat shield 72 integrally with the bearing/turbine housing, for instance by casting, also assists production of the required tolerances between the heat shield and the shaft (seal boss). In some embodiments the aperture 87 through the heat shield (and indeed the aperture 86 through the bearing housing) may be at least partially machined post-casting. In further embodiments, the aperture 87 through the heat shield and the aperture 86 through the bearing housing may be machined in one step to ensure alignment. Alternatively, aperture 87 may be machined whilst the heat shield 72 is held in position adjacent to the bearing housing 3, with a machining tool aligned with respect to a surface of the aperture 87. The annular gap 92 between the bearing housing and the heat shield may not be a cast feature but may be machined post casting. It is, however, preferable that this feature is a cast feature. Appropriate casting methods will be known to the skilled person, and include for instance lost foam, lost wax, and sand casting. In some embodiments of the invention the annular gap 92 is machined subsequently to machining of the aperture 87. In further embodiments the annular gap 92 is machined using a tool inserted through the aperture 87.

Although seal rings 90 and 91 are proposed, alternative seal arrangements may be provided between the shaft (seal boss) and the bearing housing as well as between the shaft (seal boss) and the heat shield. For instance, rather than a single seal ring 90, multiple seal rings may be provided to seal the shaft (seal boss) with respect of the bearing housing, and similarly multiple seal rings could be used to seal the shaft (seal boss) with respect to the heat shield in place of the single seal ring 91.

In the embodiment of the invention illustrated in FIGS. 4 and 5, the passage from the cavity 77 to the passage 86 is defined by the annular gap 92. In addition to allowing pressurization of the passage 85 between the seal rings 90 and 91, the annular gap 92 also helps reduce heat transfer from the heat shield 72 to the bearing housing 71, and to reduce stress which might result from thermal expansion of the heat shield. However, it is not essential for the annular gap 92 to be continuous, the gap could for instance be bridged at spaced apart circumferential locations by material extending between the heat shield 72 and the bearing housing 71. Such an arrangement may effectively provide a channel between the cavity 78 and the passage 85 in the form of a plurality of circumferentially spaced slots through a wall defining the passage 85. Similarly, the necessary communication between the cavity 78 and the passage 85 could be provided by one or more apertures, e.g. holes, provided through a housing wall extending between the heat shield 72 and bearing housing 71, defining the shaft passage 85.

In embodiments in which there is an annular gap 92 between the bearing housing 71 and the heat shield 72, it is preferable that the axial width of the gap is narrower than the axial width of the first seal ring 91 to facilitate insertion of the shaft, including seal rings, into the bearing housing through the turbine housing. Other configurations for an annular gap between the heat shield 72 and bearing housing 71 which would help prevent jamming of the seal ring 90 within the annular gap as the shaft/seal ring assembly is inserted into the housing will be apparent to the skilled person.

Other embodiments of the invention may include a reservoir or passage for collecting/removing any oil that may leak past the seal ring 90 into the cavity 78. Such oil leakage may for instance possibly occur at times in which the pressurised air supply to the cavity 78 is unavailable, or is interrupted for any reason. Any such collected oil could for example be returned to an engine or gearbox sump.

Reduction of oil flow to the first seal ring 90 is aided by provision of the annular oil collecting channel 97 which collects oil splashing back from the radial face 80*a* rotating seal boss 80 and flows this to the oil drain. This therefore helps prevent oil from collecting in the region of the seal boss 80 and reaching the first seal ring 90. A further reduction in the tendency of oil to reach the first seal ring 90 may be achieved by providing an oil slinger adjacent the seal boss 80. Oil slingers are well known to the skilled person. With the bearing assembly described above, modification would need to be made to create space for the oil slinger, for instance by incorporating a cir clip or the like to retain the turbine end of the bearing 82. In practice, with the single piece bearing 82 there may be some difficulty in creating the necessary space for a separate oil slinger, but with another bearing arrangement, such as for instance the bearing arrangement shown in FIG. 1, incorporation of a separate oil slinger may be more straightforward.

Alternatively, the seal boss 80 could be modified to improve its oil slinging properties. For instance the radial face of the boss 80 could be formed with an undercut as disclosed in U.S. Pat. No. 7,086,842 and illustrated above in FIG. 1. Such an undercut will enhance operation of the seal boss 80 itself as an oil slinger. This is particularly convenient with the embodiment of the invention illustrated in FIGS. 4 and 5 which incorporates a single piece bearing 82 which leaves little room at the turbine end of the shaft for inclusion of a separate oil slinger.

Figure 6A:
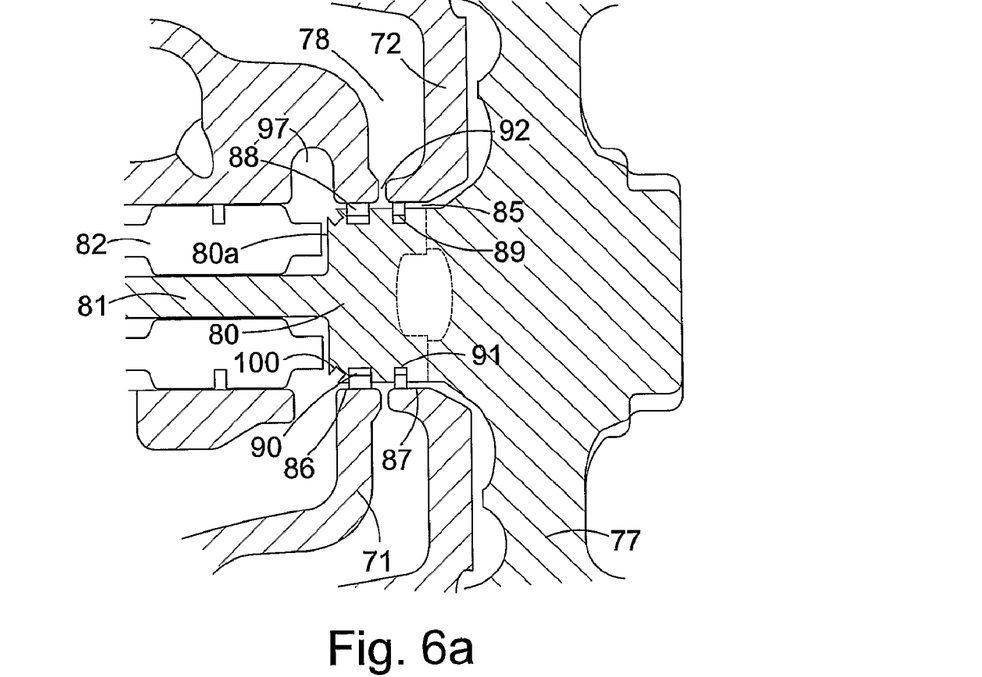
FIGS. 6a and 6b illustrate a modification of a feature of the power turbine of FIG. 4.
Figure 6B:
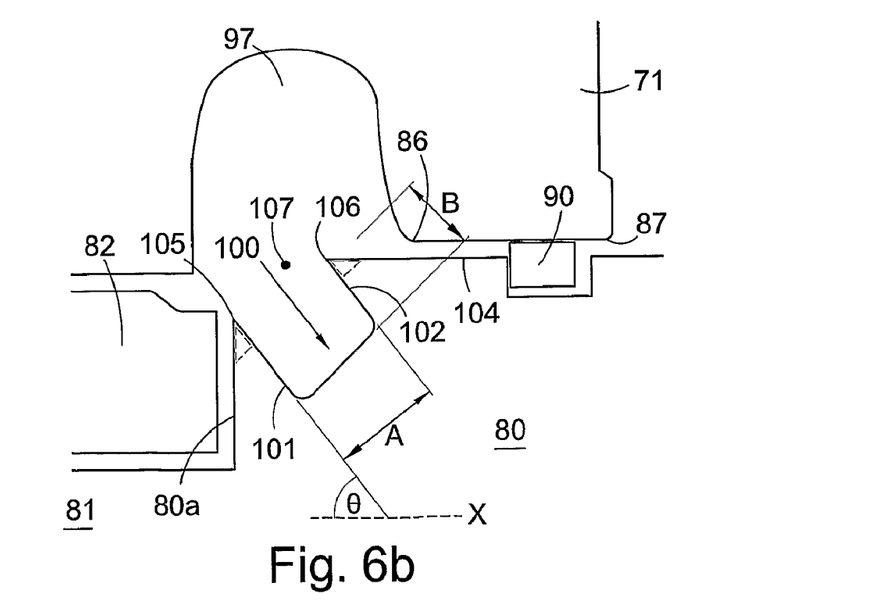

A modification of the seal boss 80 which has proved particularly effective at reducing oil flow to the first seal ring 90 is illustrated in FIGS. 6*a* and 6*b*. FIG. 6*a* corresponds to FIG. 5 except for the provision of an annular oil slinging groove 100. All of the components are identified by the same reference numerals as used in FIG. 5. The oil slinging groove 100 functions to propel oil reaching the seal boss 80 both radially and axially into the oil collecting channel 97. The configuration of the oil slinging groove 100 is shown in greater detail in FIG. 6*b*.

Referring to FIG. 6*b* the groove 100 comprises a first annular side wall 101, a second annular side wall 102 substantially parallel to the first annular side wall 101, and an annular base 103. The first annular side wall 101 lies on a conical surface which subtends an angle θ at the shaft axis X, and which intersects the plane containing the annular face 80*a* before intersecting a cylindrical surface containing the cylindrical wall 104 of the seal boss 80. The second side wall 102 lies on the surface of a cone which again subtends an angle θ at the axis X, but which intersects a cylindrical surface containing the cylindrical outer wall 104 of the seal boss 80 before intersecting a plane containing the annular face 80*a*. As such, the groove 100 has a first annular rim 105 defined where side wall 101 meets the radial seal boss face 80*a*, and a second annular rim 106 defined where the second side wall 102 meets the cylindrical wall 104 of the seal boss 80 which is both axially and radially spaced from the first rim 105. The groove 100 has an annular mouth 107 defined between the first rim 105 and the second rim 106 and which lies on a conical surface which intersects the annular face 80*a* and the cylindrical wall 104. The annular base 103 lies on a conical surface which is substantially perpendicular to the side walls 101 and 102 and parallel to the mouth 107.

The above embodiment of the present invention thus provides an effective method of reducing oil leakage across the turbine end seal without adding any additional components to the seal assembly, and with only minimal modification to conventional turbocharger components, namely appropriate profiling of the annular shoulder of the seal boss 80.

In the illustrated embodiment the first side wall 101 forms a relatively sharp annular edge where it meets the annular face 80*a* at the rim 105, and the second side wall 102 forms a relatively sharp annular edge where it meets the cylindrical wall 104 at the rim 106. In other embodiments the rims 105 and 106 may be chamfered, or may be blunted as for instance shown in dotted lines in FIG. 6b. To some extent, the degree of sharpness of the rims 104 and 105 may be determined by the technique used to form the groove 100. It is expected that rims having sharp edges as illustrated will improve oil slinging performance of the groove 100.

The oil slinging groove rims 105 and 106 lie on a conical surface which in the illustrated embodiment subtends an angle 90°-θ at the axis X of the shaft. In other embodiments of the invention in which the mouth 107 of the groove 100 is not substantially perpendicular to the side walls 105 and 106, the angle may differ from 90°-θ. The angle will, however, be greater than 0° and less than 90°. In some embodiments the angle will be greater than 20° and in other embodiments will be greater than 30°. In some embodiments the angle will be less than 70° and in other embodiments less than 60°. The angle may for instance be between 20° and 70°.

The first rim 105 lies at a smaller radius (relative to axis X) than the second rim 106, (and may lie at a smaller radius than the radially inner extremity of the second side wall 102). In some embodiments the ratio of these radii is at least 29:24. In other embodiments the ratio is 27:24 and in yet other embodiments the ratio is 25:24.

In most embodiments it is expected that the radius of the first rim 105 will be smaller than the outer radius of the journal bearing 82 adjacent the seal boss 80. In some embodiments the ratio of the radius of the radius of the first rim 105 to the radius of the journal bearing is at least 24:25. In other embodiments the ratio is at least 24:27, and in yet further embodiments the ratio is at least 24:29.

The base 103 of the groove 100 need not necessarily extend perpendicular to either the first side wall 101 or the second side wall 102. Neither is it necessary for the intersection of the base 103 with each of the side walls 101 and 102 to be radiused as shown in FIG. 6b.

The separation A of the side walls 101 and 102 may differ from that illustrated, and may differ in proportion to the depth B of the groove defined as the average of the height of the side walls 101 and 102. For instance, in some embodiments the ratio A:B may be about 2.5:1 and in other embodiments it may be less than this. For example, the ratio may be less than 2:1 or even 1.5:1. In yet further embodiments a minimum ratio may be 0.5:1, 0.75:1 or 1:1. In embodiments in which the side walls 101 and 102 are not parallel the dimension A may be the maximum width of the groove 100 or the width of the mouth of the groove. Similarly, in embodiments in which the base 103 is not perpendicular to side wall 101 and/or 102, the dimension B may be the maximum depth of the groove measured from the mouth of the groove.

The overall dimension of the groove 100 may to some extent depend on the dimension of the seal boss 80. In typical embodiments the seal boss 80 may have a diameter or between about 15 mm and 40 mm, but diameters outside of this range are also possible.

It will be appreciated that the exact form of the oil groove 97 may vary. For instance, in some turbocharger bearing housing designs the oil groove may extend nearly 360° around the shaft, and in others the groove may extend through a smaller angle. The details of the oil groove 97 can be entirely conventional. Alternatively, the oil groove 97 could be modified by angling the side walls of the groove, and in particular the inboard side wall, which in some embodiments enhance the oil collecting performance.

Figure 7:
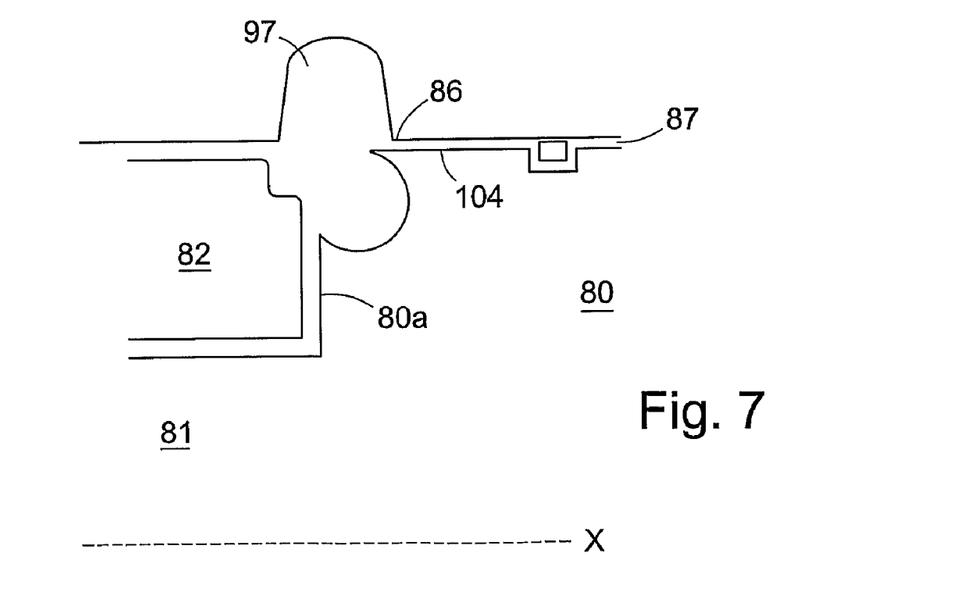
FIG. 7 illustrates a modification of the power turbine of FIGS. 6a and 6b.

In the illustrated embodiment the side walls 101 and 102 lie on conical surfaces which intersect a conical surface on which the bottom wall 103 lies (and also intersect a conical surface containing the rims 105 and 106). In alternative embodiments the base 103 may be concave or even convex, and curve away from any particular conical surface. In yet further embodiments, the side wall 101 and/or side wall 102 may be concave or convex and curve away from any particular conical surface. For example, the walls 101, 102 and 103 might be replaced by a single concave wall as illustrated schematically in FIG. 7. With a groove configured as shown in FIG. 7, the groove still has a mouth 107 defined between an annular rim 105 and an annular rim 106 which lie on a conical surface which intersects a cylindrical surface containing the seal boss wall 104 and the radial plane containing the annular face 80a. Although curved in cross-section as illustrated, the groove may have an overall dimension which broadly corresponds to the various possible relative dimensions of groove 100 of FIGS. 6a and 6b.

Although in the embodiments of the invention illustrated in FIGS. 60, 6b and 7, the oil slinging groove has a uniform cross-section around its circumference, in other embodiments the cross-section may vary. For instance, the groove may be wider or deeper at some circumferential positions than at others. Similarly, the shape of the groove walls and/or their orientation relative to one another, may vary around the circumference of the groove. Similarly, the radius of each rim 105 and 106, and/or width of the mouth 107 of the groove, may vary around the circumference of the groove.

Other possible modifications of the embodiments of the invention described above will be readily apparent to the appropriately skilled person.

The invention claimed is:

1. A turbomachine comprising:
   a housing defining a bearing cavity and a turbine chamber separated by a first wall;
   a turbine wheel mounted to a shaft for rotation within said turbine chamber about a machine axis;
   a heat shield disposed between the first wall and the turbine wheel, a heat shield cavity being defined between the first wall and the heat shield, and contact between the heat shield and the housing substantially seals a periphery of the heat shield cavity;
   the shaft extending from the turbine chamber into the bearing cavity through a passage defined at least in part by a first aperture in said wall and a second aperture in the heat shield, the shaft being mounted for rotation on a bearing assembly provided in the bearing cavity;
   a first seal between the shaft and said first aperture;
   the housing defining a first gas channel communicating with the heat shield cavity for connection to a pressure source for raising pressure within the heat shield cavity; and
   a second channel between the heat shield cavity and said passage, the second channel opening to said passage on the opposite side of said first seal to said bearing assembly;
   wherein:
      the shaft has an enlarged diameter portion which is located and rotates within said passage;
      said enlarged diameter portion of the shaft defines a generally radially extending annular wall which faces said bearing assembly;
      said annular wall is configured to propel oil radially away from said shaft as said shaft rotates; and
      said enlarged diameter portion of the shaft has a radially outer circumferential surface extending generally axially, and wherein an oil slinging groove extends into the enlarged portion, the oil slinging groove having a mouth defined between a first circumferentially extending rim and a second circumferentially extending rim, wherein the second rim is spaced both radially and axially from the first rim.

2. A turbomachine according to claim 1, wherein said first seal comprises one or more seal rings.

3. A turbomachine according to claim 2, wherein at least one seal ring comprises a split overlapping ring.

4. A turbomachine according to claim 2, wherein the or each seal ring is mounted in an annular groove defined by said shaft.

5. A turbomachine according to claim 1, further comprising a second seal provided between the shaft and said second aperture wherein said second seal comprises one or more seal rings.

6. A turbomachine according to claim 5, wherein the or each seal ring is a split ring seated within an annular groove defined by the shaft.

7. A turbomachine according to claim 1, wherein said second channel comprises an annular gap defined between said wall and said heat shield between said first and second apertures.

8. A turbomachine according to claim 1, wherein said second channel comprises one or more circumferentially extending slots defined around said passage.

9. A turbomachine according to claim 1, wherein said second channel comprises one or more apertures opening into said passage and said heat shield cavity.

10. A turbomachine according to claim 1, wherein said first channel extends between said heat shield cavity and an external surface defined by the housing.

11. A turbomachine according to claim 1, wherein said first channel comprises a plurality of channels.

12. A turbomachine according to claim 1, wherein the housing defines a substantially annular oil collecting groove within said bearing cavity circumferentially surrounding said radial wall.

13. A turbomachine according to claim 1, wherein the first and second rims extend around the entire circumference of the large diameter portion of the shaft.

14. A turbomachine according to claim 1, wherein the mouth of the groove opens at said radially extending annular wall to define said first rim, and opens at said generally axially extending circumferential surface to define said second rim.

15. A turbomachine according to claim 1, wherein said groove comprises a base, a first side wall extending from said first rim to said base, and a second side wall extending from said second rim to said base.

16. A turbomachine according to claim 15, wherein said first and second side walls are generally parallel to each other, and said base is generally perpendicular to the first and second side walls.

17. A turbomachine according to claim 1, wherein said wall extends away from said first aperture in a generally radial direction relative to the shaft.

18. A turbomachine according to claim 1, wherein said heat shield extends away from said second aperture in a generally radial direction relative to said shaft.

19. A turbomachine according to claim 1, wherein said wall and said heat shield meet to define a radially outer circumferential periphery of said heat shield cavity.

20. A turbomachine according to claim 1, wherein said first channel is connected to a source of pressurised air.

21. A turbomachine according to claim 1, wherein the turbomachine is a turbocharger including a turbine housing defining said turbine chamber, and a bearing housing defining said bearing cavity.

22. A turbomachine according to claim 1, wherein said turbomachine is a power turbine including a turbine housing defining said turbine chamber, and a bearing housing defining said bearing cavity.

23. A turbomachine according to claim 21, wherein said wall is a wall of the bearing housing.

24. A method of reducing oil leakage in a turbomachine comprising a housing defining a bearing cavity and a turbine chamber separated by a first wall;
a turbine wheel mounted to a shaft for rotation within said turbine chamber about a machine axis;
a heat shield disposed between the first wall and the turbine wheel, a heat shield cavity being defined between the first wall and the heat shield, and contact between the heat shield and the housing substantially seals a periphery of the heat shield cavity;
the shaft extending from the turbine chamber into the bearing cavity through a passage defined at least in part by a first aperture in said wall and a second aperture in the heat shield, the shaft being mounted for rotation on a bearing assembly provided in the bearing cavity;
a first seal between the shaft and said first aperture;
a second channel between the heat shield cavity and said passage, the second channel opening to said passage on the opposite side of said first seal to said bearing assembly; and
a method comprising supplying pressurised air to said heat shield cavity to raise the pressure within the heat shield cavity and thereby raise the pressure within the passage on the opposite side of said first seal to said bearing assembly;
wherein:
the heat shield forms at least part of a wall of a turbine diffuser in fluid communication with the turbine wheel; and
the contact between the heat shield and the housing is disposed in the wall of the turbine diffuser.

25. A turbomachine according to claim 1, wherein the heat shield and the housing are a unitary housing.

26. A turbomachine according to claim 1, wherein:
the heat shield forms at least part of a wall of a turbine diffuser in fluid communication with the turbine wheel; and
the contact between the heat shield and the housing is disposed in the wall of the turbine diffuser.

27. A turbomachine according to claim 1, further comprising a pressurized gas source configured to pressurize the heat shield cavity to a pressure less than a pressure of a fluid supplied to the bearing cavity.

28. A turbomachine comprising:
a housing defining a bearing cavity and a turbine chamber separated by a first wall;
a turbine wheel mounted to a shaft for rotation within said turbine chamber about a machine axis;
a heat shield disposed between the first wall and the turbine wheel, a heat shield cavity being defined between the first wall and the heat shield;
the shaft extending from the turbine chamber into the bearing cavity through a passage defined at least in part by a first aperture in said wall and a second aperture in the heat shield, the shaft being mounted for rotation on a bearing assembly provided in the bearing cavity;
a first seal between the shaft and said first aperture;
the housing defining a first gas channel communicating with the heat shield cavity for connection to a pressure source for raising pressure within the heat shield cavity;

a second channel between the heat shield cavity and said passage, the second channel opening to said passage on the opposite side of said first seal to said bearing assembly; and a second seal provided between the shaft and said second aperture;

wherein:
  the shaft has an enlarged diameter portion which is located and rotates within said passage;
  said enlarged diameter portion of the shaft defines a generally radially extending annular wall which faces said bearing assembly;
  said annular wall is configured to propel oil radially away from said shaft as said shaft rotates; and
  said enlarged diameter portion of the shaft has a radially outer circumferential surface extending generally axially, and wherein an oil slinging groove extends into the enlarged portion, the oil slinging groove having a mouth defined between a first circumferentially extending rim and a second circumferentially extending rim, wherein the second rim is spaced both radially and axially from the first rim.

29. A turbomachine according to claim 28, wherein the first and second rims extend around the entire circumference of the large diameter portion of the shaft.

30. A turbomachine according to claim 28, wherein the mouth of the groove opens at said radially extending annular wall to define said first rim, and opens at said generally axially extending circumferential surface to define said second rim.

31. A turbomachine according to claim 28, wherein said groove comprises a base, a first side wall extending from said first rim to said base, and a second side wall extending from said second rim to said base.

32. A turbomachine according to claim 31, wherein said first and second side walls are generally parallel to each other, and said base is generally perpendicular to the first and second side walls.

33. A method of reducing oil leakage in a turbomachine comprising a housing defining a bearing cavity and a turbine chamber separated by a first wall;
  a turbine wheel mounted to a shaft for rotation within said turbine chamber about a machine axis;
  a heat shield disposed between the first wall and the turbine wheel, a heat shield cavity being defined between the first wall and the heat shield, and contact between the heat shield and the housing substantially seals a periphery of the heat shield cavity;
  the shaft extending from the turbine chamber into the bearing cavity through a passage defined at least in part by a first aperture in said wall and a second aperture in the heat shield, the shaft being mounted for rotation on a bearing assembly provided in the bearing cavity;
  a first seal between the shaft and said first aperture;
  a second channel between the heat shield cavity and said passage, the second channel opening to said passage on the opposite side of said first seal to said bearing assembly; and
  a method comprising supplying pressurised air to said heat shield cavity to raise the pressure within the heat shield cavity and thereby raise the pressure within the passage on the opposite side of said first seal to said bearing assembly;

wherein:
  the shaft has an enlarged diameter portion which is located and rotates within said passage;
  said enlarged diameter portion of the shaft defines a generally radially extending annular wall which faces said bearing assembly;
  said annular wall is configured to propel oil radially away from said shaft as said shaft rotates; and
  said enlarged diameter portion of the shaft has a radially outer circumferential surface extending generally axially, and wherein an oil slinging groove extends into the enlarged portion, the oil slinging groove having a mouth defined between a first circumferentially extending rim and a second circumferentially extending rim, wherein the second rim is spaced both radially and axially from the first rim.

34. A turbomachine comprising:
a housing defining a bearing cavity and a turbine chamber separated by a first wall;
a turbine wheel mounted to a shaft for rotation within said turbine chamber about a machine axis;
a heat shield disposed between the first wall and the turbine wheel, a heat shield cavity being defined between the first wall and the heat shield, and contact between the heat shield and the housing substantially seals a periphery of the heat shield cavity;
the shaft extending from the turbine chamber into the bearing cavity through a passage defined at least in part by a first aperture in said wall and a second aperture in the heat shield, the shaft being mounted for rotation on a bearing assembly provided in the bearing cavity;
a first seal between the shaft and said first aperture;
the housing defining a first gas channel communicating with the heat shield cavity for connection to a pressure source for raising pressure within the heat shield cavity; and
a second channel between the heat shield cavity and said passage, the second channel opening to said passage on the opposite side of said first seal to said bearing assembly;

wherein:
  the heat shield forms at least part of a wall of a turbine diffuser in fluid communication with the turbine wheel; and
  the contact between the heat shield and the housing is disposed in the wall of the turbine diffuser.

* * * * *